Oct. 11, 1938.   P. W. STEPHENS   2,133,060
CLOSURE FOR PRESSURE COOKERS
Filed Dec. 30, 1936   2 Sheets-Sheet 1

Inventor:
Percy W. Stephens,
By Byrnfoth, Lee, Chritin & Miles,
Attys.

Oct. 11, 1938.   P. W. STEPHENS   2,133,060
CLOSURE FOR PRESSURE COOKERS
Filed Dec. 30, 1936   2 Sheets-Sheet 2
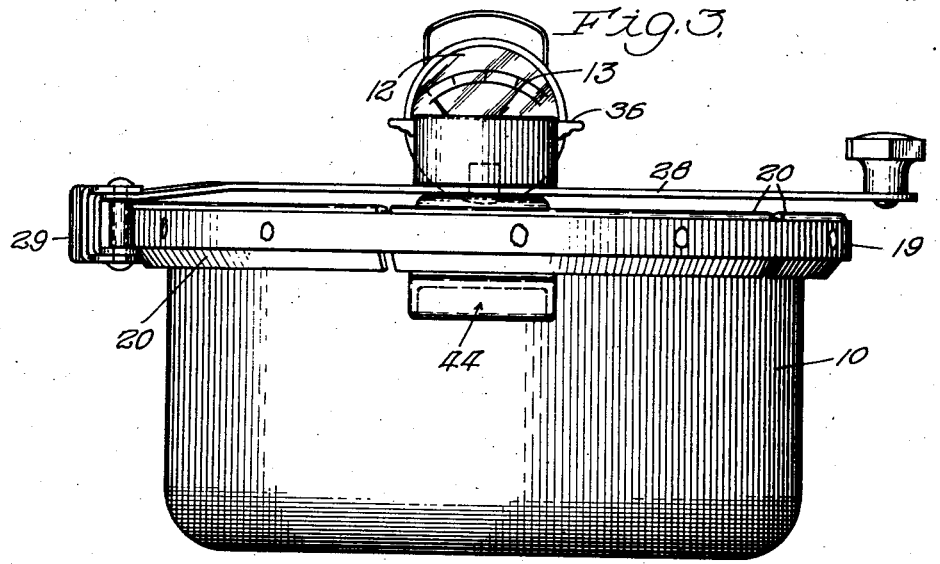
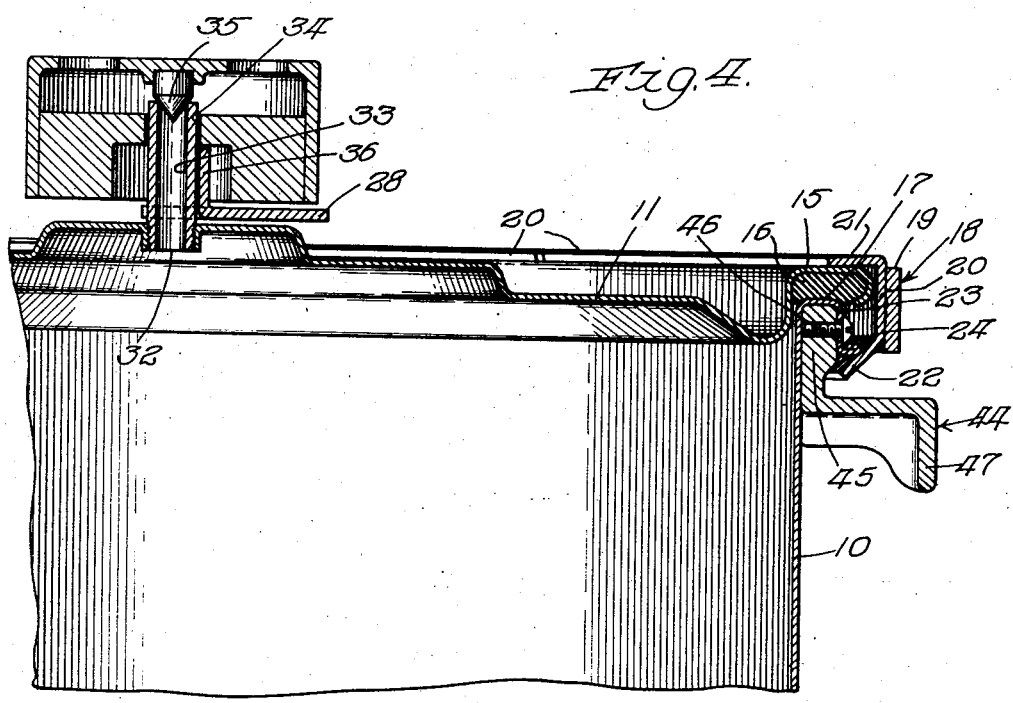
Inventor:
Percy W. Stephens, Patented Oct. 11, 1938

2,133,060

UNITED STATES PATENT OFFICE 2,133,060

CLOSURE FOR PRESSURE COOKERS

Percy W. Stephens, Chicago, Ill.

Application December 30, 1936, Serial No. 118,401

6 Claims. (Cl. 220—61)

This invention relates to pressure cookers, and more particularly to improved closure and handle means therefor.

The present application is a continuation in part of an application bearing Serial No. 89,189 and heretofore filed on July 6, 1936.

Figure 1:
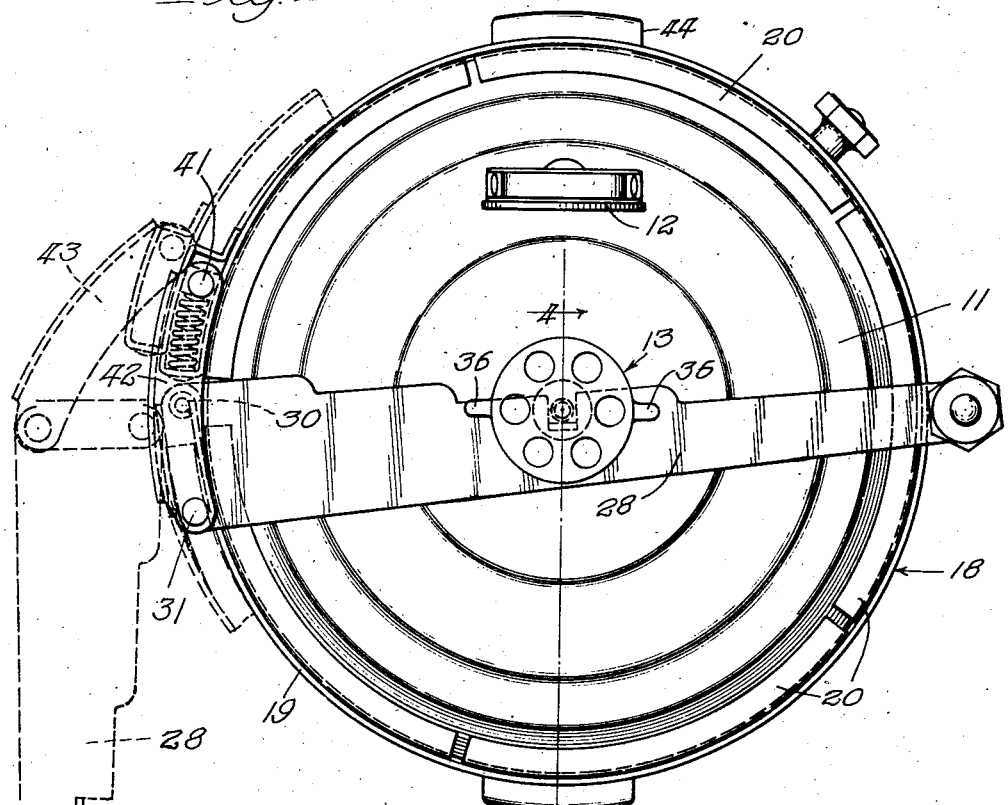
Figure 2:
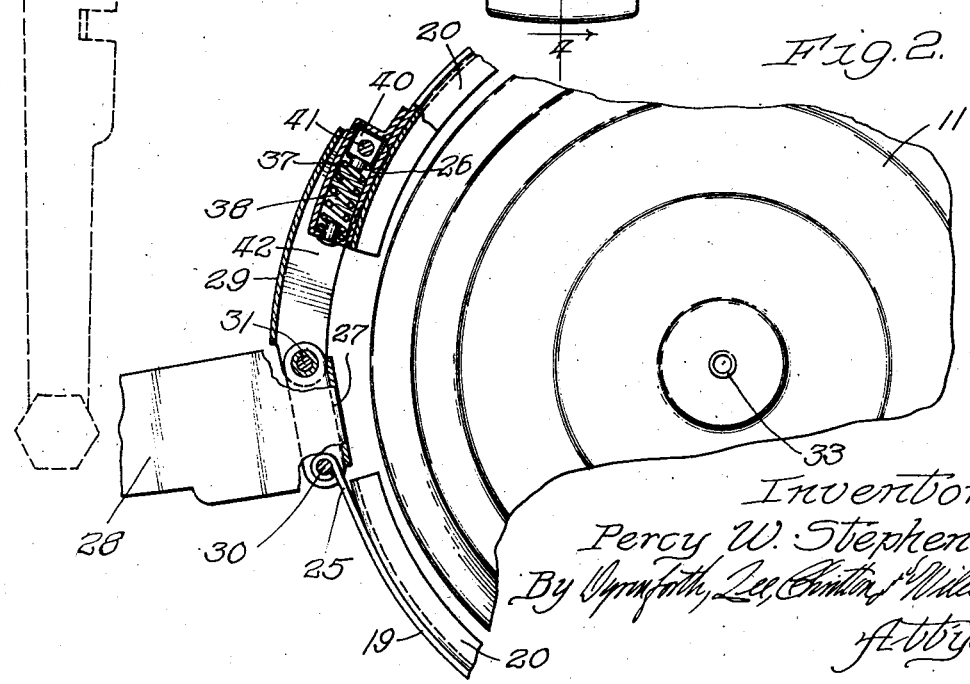

One feature of this invention is that it provides a one piece positively operated closure band for sealing the cover to the body portion of the cooker; another feature of this invention is that yielding means is provided through which the sealing tension of the band is exerted; yet another feature is that this yielding means is a coil spring so arranged that breakage thereof does not destroy the seal between the cover and the body portion of the cooker; still another feature of this invention is that the spring is sheathed when the band is in sealing position; a further feature of this invention is a handle so arranged as to be fastened to the cooker at a point where no pressure differential exists; other features and advantages of this invention will be apparent from the following specification and the drawings, in which:

Figure 1 is a top plan view of such a cooker; Fig. 2 is a fragmentary view of the same cooker, partly in section; Fig. 3 is a side elevation of the cooker; and Fig. 4 is a vertical fragmentary sectional view along the line 4—4 of Fig. 1.

In order to make an operative pressure cooker some means must be provided for clamping the cover to the body portion of the cooker to effect a seal therebetween sufficient to maintain the desired pressure in the cooker. This invention provides a closure or clamping means positively operable for clamping or disengaging, the whole so arranged that a single movement effects a tight seal all the way around the periphery of the cover. In order to insure a seal of sufficient pressure despite variations in gasket thickness, wear of parts, and the like, the closure is provided with yielding spring means through which the closing pressure is exerted. Differences in the effective diameter of the closure band necessary for proper sealing are absorbed in this spring.

The cooker is also provided with an improved handle which is so constructed and located with respect to the body of the cooker that the rivet or other fastening means does not have to extend through a portion of the cooker where a pressure differential exists. The handle also serves to reinforce the downwardly turned curl against which the closure band exerts its pressure.

In the particular embodiment of this invention illustrated herewith a pressure cooker is shown having a body portion 10 and a cover 11. The cover 11 has thereon a pressure gauge 12 of standard type, a relief valve 13, and a handle or knob 14 of heat insulating material. The cover 11 is provided with a channelled peripheral portion 15 having therein an annular gasket 16 adapted to contact the lip or upper edge 17 of the body portion 10 of the cooker.

Closure means 18 is provided for clamping the cover into sealing engagement with the edge 17, this closure means comprising a flexible metal band 19 having fastened thereto closure segments 20 having a top flange 21 and a bottom flange 22. It will be noted that the top flange 21 diverges downward from the plane of the band at a slight angle, and that the bottom flange 22 diverges substantially from the plane of the band being here shown at an angle of about forty-five degrees with such plane.

The upper part of the body portion 10, as will be best seen in Fig. 4, is provided with an outwardly and downwardly turned curl having the upper substantially horizontal portion 17 and a downwardly turned portion 23 spaced from the body portion 10. It will be noted that this downwardly turned portion is rolled back on itself, as by a curling die, to provide a substantially rigid annular peripheral roll or bead 24 adapted to be engaged by the angularly disposed surface of the bottom flange 22.

The flexible band 19 has two ends 25 and 26 normally adjacent or not substantially separated from each other. The ends of the flexible band 19 are adapted to be drawn together or separated to vary the effective diameter of the closure member, by the action of toggle means comprising a base 27 of an operating lever 28 and a connecting link 29. One end of the base 27 of the operating lever is connected to the end 25 of the flexible band 19 as by a pivot 30; one end of the link 29 is operatively connected to the end 26 of the band; and the base 27 of the lever and the link 29 are pivotally connected together at a point 31. Movement of the lever 28 thus actuates the toggle means to vary the separation of the ends and thus the effective diameter of the closure band, either drawing it together to clamp the cover onto the body portion of the cooker or expanding the band to enable it to be conveniently removed from closure relationship with the cooker.

Referring again to Fig. 4, it will be seen that contraction of the band by the toggle means results, through the interaction of the bead 24 and the diverging flange 22, to seat the cover firmly on the surface 17. The top flange 21 is set at a slight downward angle to the plane of the band, as described above, and thus the sealing pressure on the cover is effected at a point substantially central to the gasket 16 rather than near the outer edge thereof. The cover 11 has an opening 32 therethrough in which a tube 33 is mounted. Valve means is provided for closing the upper end of this tube, here shown as a valve body having a central aperture 34 adapted to engage the tube 33 and a cone-shaped valve member 35 adapted to project down into and close the top of the tube 33. The valve body is preferably provided with a handle 36 of heat insulating material, enabling it to be conveniently removed when the cooker is hot. The internal diameter of the tube 33 and the weight of the valve are so proportioned that pressures within the cooker up and to the desired maximum will not lift the valve member 35 from its seat in the top of the tube, but higher pressures will lift it and thus vent the vapor pressure existing within the cooker.

The lever 28 which operates the toggle means is provided with an upturned portion 36 adapted to abut the tube 33 and to be engaged by the valve when the lever 28 is in closed or clamping position and the valve is in sealing position. To close the cooker the cover is placed in position, the closure band placed around it in the proper plane, and the lever 28 moved into the position shown in Fig. 1 to draw the ends of the metal band 19 together and thus clamp the cover onto the body portion of the cooker. When the lever is in closed position with the upturned portion 36 abutting the tube 33, the valve is placed over the tube and the lever 28 is thus locked in closed position. Before the closure means can be loosened to remove the cover, therefore, the valve must be removed to vent any pressure within the cooker.

Referring more particularly to Figs. 1 and 2, it will be seen that the end 26 of the band 19 is turned back on itself to form a socket 37, closed on two sides and at the ends thereof. A coil spring 38 is mounted in the socket abutting the forward end, where it is held in position by a rivet or pin 39. It will be understood that any yielding or resilient means may be used, although a coil spring is preferable. The end of the link 29 is slidably splined in the socket at the other end of the spring 38, here shown as comprising a block 40 lying within the socket and a pivot pin 41 connecting the link 29 to the block. The link 29 has wing portions 42 and 43 which lie above and below the socket when the band is in closed or sealing position, thus sheathing the spring. This feature prevents an undesirable deposit of grease, soot or the like from forming on the spring when the cooker is over a flame.

The presence of the spring 38 through which the closing tension of the toggle means is exerted on the band is very advantageous. It enables a positive toggle action to be used despite small differences in the effective diameter of the band when in sealing position. Such differences can arise from variation in tolerances in manufacturing, or from changes in the thickness of the gasket 16 during long continued use, and the like. The use of a coil spring mounted and arranged as shown enables easy replacement of the spring should it break at any time. Moreover, the fact that it is a coil spring provides a safety feature in that breakage during use on the cooker will not break the seal. That is, since the coil spring is sheathed in on all four sides when the band is in sealing position breakage thereof merely results in a shift of the band equivalent to the space existing between turns of the spring, and this is not sufficient to break the seal and cause the loss of the pressure existing within the cooker.

Referring more particularly to Fig. 4, it will be seen that the cooker is provided with a handle 44 having a portion 45 lying between the body portion 10 and the downwardly turned portion 23 thereof. The portion 45 is so constructed as to substantially fill the space between the body portion 10 and the downwardly turned portion and is arranged to be fastened in place by means passing through the downwardly turned portion 23 rather than the body portion of the cooker. This means is here shown as a screw 46. The handle 44 extends downwardly and outwardly from this last mentioned portion and terminates in a portion 47 adapted to be gripped by the hand.

The arrangement of the handle shown herewith enables it to be fastened in place with the use of a screw not passing through the body portion 10 of the cooker where a pressure differential exists. Where the pressure on one side of the screw is considerably higher than the other, it has been found almost impossible to provide a true seal which does not, under constant usage, leak around the screw. The arrangement shown not only enables the screw to be placed through a portion where no pressure differential exists, but also serves to support the bead 24 against which the flange 22 exerts pressure during use. It will be understood that any appropriate means may be used to fasten the handle in place which does not project through the body portion 10 into the inner part of the cooker.

While I have shown and described certain embodiments of my invention, it is to be understood that it is capable of many modifications. Changes, therefore, in the construction and arrangement may be made without departing from the spirit and scope of the invention as disposed in the appended claims, in which it is my intention to claim all novelty inherent in my invention as broadly as permissible, in view of the prior art.

I claim:

1. A closure device for sealing the cover to the body portion of a container, including: a substantially circular flexible metal band having flanges extending inwardly therefrom, at least one of said flanges diverging from the plane of said band, said band having two normally adjacent ends; a socket on one end of said band; a coil spring in said socket; and toggle means for positively varying the separation of said ends to vary the effective diameter of said band, said means having one end thereof slidably splined in said socket and in contact with said spring, whereby closing pressure is exerted through said spring.

2. A closure device for sealing the cover to the body portion of a container, including: a substantially circular flexible metal band having flanges extending inwardly therefrom, at least one of said flanges diverging from the plane of said band, said band having two normally adjacent ends, one of said ends being turned back to form a socket closed on two sides; a coil spring in said socket abutting the forward end thereof; and toggle means for positively varying the separation of said ends to vary the effective diameter, said toggle means having one end thereof slidably splined in said socket and abutting the other end of said spring, whereby closing pressure is exerted through said spring.

3. Apparatus of the character claimed in claim 2, wherein said toggle means has a portion thereof so formed as to sheath the open sides of said socket when said band is in sealing relation to said cover and body portion.

4. A container of the character described, including: a body portion having an outwardly and downwardly turned peripheral curl at the top thereof; a cover adapted to form a closure for said container; a closure band having inwardly extending flanges, at least one of said flanges diverging from the plane of said band, one of said flanges being adapted to contact said cover and the other said curl, whereby contraction of said band seals said cover to said body portion; and a handle having a portion thereof lying between the body of said container and the downwardly turned portion of said curl, and a portion extending downwardly and outwardly therefrom.

5. Apparatus of the character claimed in claim 4, wherein said handle is fastened to the downwardly turned portion of said curl.

6. Apparatus of the character claimed in claim 4, wherein the portion of said handle lying between said body and said downwardly turned portion fills the entire space therebetween and is fastened to said downwardly turned portion by means extending therethrough.

PERCY W. STEPHENS.